W. H. Pierce,
Mincer.

No. 94,237.      Patented Aug. 31, 1869.

Witnesses.
Herbert T. Whitman
Geo. H. Young.

Inventor.
Wm. H. Pierce
By T. W. Porter Atty

United States Patent Office.

WILLIAM H. PEIRCE, OF BANGOR, MAINE.

Letters Patent No. 94,237, dated August 31, 1869.

IMPROVED MINCING-MACHINE.

The Schedule referred to in these Letters Patent and making part of the same.

*To all whom it may concern:*

Be it known that I, WILLIAM H. PEIRCE, of Bangor, in the county of Penobscot, and State of Maine, have invented a new and useful Mincing-Machine; and I do hereby declare that the following, taken in connection with the drawings, which accompany and form part of this specification, is a description of my invention, sufficient to enable those skilled in the art to which it appertains to practise it.

The nature of my invention consists in a machine for mincing or fine-cutting meat or vegetables; and it is constructed with a vessel or hopper, in which the meat is held, this hopper being arranged to revolve freely upon a short pivot, fixed in the platform, while the cutting is performed by an oval blade, attached, at a suitable angle, (other than a right angle,) to a vertical shaft, revolving in a vibrating bracket, the cutter being so arranged that its friction against the dish shall revolve the same, and thereby bring all parts of the meat in contact with the edge of the cutter.

Similar letters of reference indicate corresponding parts in the several figures.

In the drawings—

A represents the base, which may be of any desired form, as convenience may require.

Figure 1:
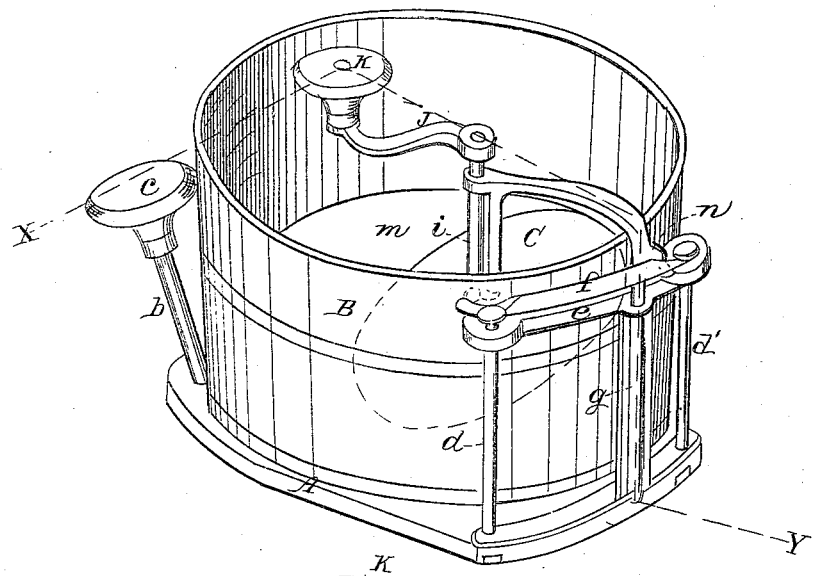
Figure 1 is a perspective view.
Figure 2:
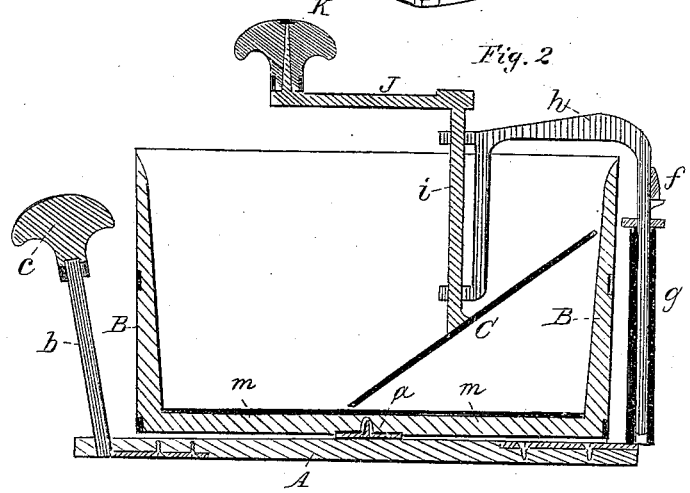
Figure 2 is a vertical section, taken on line $x$ $x$, fig. 1.

$a$ is a short pivot, secured to base A, and upon which the dish B revolves, the contact being plainly shown in fig. 2.

$b$ is a short rod, attached to base A, having a knob, $c$, fastened upon it, for convenience of holding when in use.

$d$ and $d'$ are also two rods, rigidly secured to base A, and $e$ is a bar secured to these rods, as shown.

$g$ is a tube, which extends from bar $e$ to base A.

In this tube is inserted the rounded portion of bracket $h$, which moves freely in the tube.

A part of bracket $h$ extends down into dish B, so as to form two bearings, in which the vertical shaft $i$ freely revolves.

Upon the lower end of shaft $i$ is secured the oval cutting-blade C, as shown in fig. 2. This blade bears upon the bottom $m$ of dish B, and by the force of spring $f$, which bears against knuckle $n$, formed upon bracket $h$, the blade constantly bears against the side of the vessel.

In use, the machine may be either set upon a table or held in the operator's lap, when, taking hold of the knob $k$, secured to crank $j$, secured upon shaft $i$, the blade C may be easily and rapidly rotated.

As the blade revolves, the contact thereof with the side of the dish, serves to revolve the same; and as the point of contact between the two is constantly changing from the bottom of the dish to the highest point reached by the blade, therefore these two changes serve to bring all parts of the material being minced under the action of the blade, without the bestowal of any care of the operator to that end.

Having thus described my invention,

What I claim as new, and desire to secure by Letters Patent, is—

1. Combining with the dish B, an oval rotary cutter, C, substantially in manner as and for the purposes specified.

2. The combination of the revolving dish B, oval cutter C, adjustable bracket $h$, adjustable spring $e$, or its equivalent, and platform A, substantially as and for the purposes specified.

WM. H. PEIRCE.

Witnesses:
H. L. MITCHELL,
H. B. FARNHAM.